US012707058B2

(12) United States Patent
Astola et al.

(10) Patent No.: US 12,707,058 B2
(45) Date of Patent: Aug. 11, 2026

(54) APPARATUS, A METHOD AND A COMPUTER PROGRAM FOR VIDEO CODING AND DECODING

(71) Applicant: Nokia Technologies Oy, Espoo (FI)

(72) Inventors: Pekka Astola, Tampere (FI); Jani Lainema, Tampere (FI); Ramin Ghaznavi Youvalari, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/850,946

(22) PCT Filed: Jan. 16, 2023

(86) PCT No.: PCT/FI2023/050035
§ 371 (c)(1),
(2) Date: Sep. 25, 2024

(87) PCT Pub. No.: WO2023/187250
PCT Pub. Date: Oct. 5, 2023

(65) Prior Publication Data

US 2025/0227239 A1 Jul. 10, 2025

(30) Foreign Application Priority Data

Mar. 29, 2022 (FI) ..................................... 20225267

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11); *H04N 19/186* (2014.11)

(58) Field of Classification Search
CPC .. H04N 19/105; H04N 19/132; H04N 19/176; H04N 19/186
See application file for complete search history.

(56) References Cited

U.S. PATENT DOCUMENTS 12,113,973 B2 * 10/2024 Paluri .................. H04N 19/172
2007/0025447 A1 * 2/2007 Kojokaro ............. H04N 19/139
375/E7.176

(Continued)

FOREIGN PATENT DOCUMENTS

| | | | |
|---|---|---|---|
| JP | 2019-525679 | A | 9/2019 |
| KR | 20200076809 | A | 6/2020 |
| WO | 2020/262396 | A1 | 12/2020 |

OTHER PUBLICATIONS

"Video coding for low bit rate communication", Series H: Audiovisual and Multimedia Systems, Infrastructure of audiovisual services—Coding of moving video, Recommendation ITU-T H.263, Jan. 2005, 226 pages.

(Continued)

*Primary Examiner* — Md N Haque
(74) *Attorney, Agent, or Firm* — McCarter & English, LLP; Joseph C. Drish

(57) ABSTRACT

A method comprising: receiving an image block unit of a frame, the image block unit comprising samples in color channels comprising at least one chrominance channel and one luminance channel (900); reconstructing samples of said luminance channel of the image block unit (902); determining a reference area for predicting samples of at least one color channel of the image block unit, wherein said reference area comprises one or more of reference samples in a neighboring block in current color channel/frame, in the neighboring of a co-located block in reference color channel/frame; and/or inside the co-located block in reference color channel/frame (904); determining filter coefficients of (Continued)

a filter for said predicting based on the reference samples and a shape of the filter (906); and predicting samples of at least one color channel of the image block unit by performing a convolution between the samples of said luminance channel and the filter coefficients (908).

16 Claims, 9 Drawing Sheets

(51) Int. Cl.
*H04N 19/176* (2014.01)
*H04N 19/186* (2014.01)

(56) References Cited

U.S. PATENT DOCUMENTS

| | | | | |
|---|---|---|---|---|
| 2018/0063527 A1* | 3/2018 | Chen | ...................... | H04N 19/82 |
| 2020/0244960 A1* | 7/2020 | Sarwer | ................... | H04N 19/12 |
| 2022/0248007 A1* | 8/2022 | Misra | ................... | H04N 19/117 |

OTHER PUBLICATIONS

"Advanced video coding for generic audiovisual services", Series H: Audiovisual and Multimedia Systems, Infrastructure of audiovisual services—Coding of moving video, Recommendation ITU-T H.264, Aug. 2021, 844 pages.

"Versatile Video Coding", Series H: Audiovisual and Multimedia Systems Infrastructure of audiovisual services—Coding of moving video, Recommendation ITU-T H.266, Aug. 2020, 516 pages.

"IEEE 802.11", Wikipedia, Retrieved on Mar. 17, 2025, Webpage available at : https://en.wikipedia.org/wiki/IEEE_802.11.

"Information technology—Generic coding of moving pictures and associated audio information: Systems", Series H: Audiovisual and Multimedia Systems, Infrastructure of audiovisual services—Transmission multiplexing and synchronization, Recommendation ITU-T H.222.0, Jun. 2021, 340 pages.

"Information Technology—Coding of Audio-Visual Objects—Part 12: ISO Base Media File Format", ISO/IEC 14496-12, Fifth edition, Dec. 15, 2015, 248 pages.

"Information technology—Coding of audio-visual objects—Part 15: Carriage of network abstraction layer (NAL) unit structured video in the ISO base media file format", ISO/IEC 14496-15, 2021, 282 pages.

"High efficiency video coding", Series H: Audiovisual and Multimedia Systems, Infrastructure of audiovisual services—Coding of moving video, Recommendation ITU-T H.265, Aug. 2021, 716 pages.

Office action received for corresponding Finnish Patent Application No. 20225267, dated Nov. 1, 2022, 11 pages.

Misra et al., "On Cross Component Adaptive Loop Filter for Video Compression", Picture Coding Symposium (PCS), Nov. 12-15, 2019, 5 pages.

Tsai et al., "Adaptive Loop Filtering for Video Coding", IEEE Journal of Selected Topics in Signal Processing, vol. 07, No. 06, Dec. 2013, pp. 934-945.

Astola et al., "AHG12: Convolutional cross-component model (CCCM) for intra prediction", Joint Video Experts Team (JVET) of ITU-T SG 16 WP 3 and ISO/IEC JTC 1/SC 29, JVET-Z0064-v1, 26th Meeting, Apr. 20-29, 2022, pp. 1-5.

International Search Report and Written Opinion received for corresponding Patent Cooperation Treaty Application No. PCT/FI2023/050035, dated Jun. 29, 2023, 18 pages.

Office action received for corresponding Vietnamese Patent Application No. 1-2024-07772, dated Feb. 28, 2025, 1 page of office action and 1 page of translation available.

Kim J. et al. "Parameter Derivation for Intra LM Chroma Prediction" MPEG Meeting; Jul. 16, 2021-Jul. 20, 2012; Stockholm; ISO/IEC JTC1/SC29/WG11, No. m25475, Jul. 9, 2012.

Browne A. et al. "Algorithm Description for Versatile Video Coding and Test Model 15" JVET Meeting; Oct. 6, 2021-Nov. 15, 2021; Teleconference; Dec. 28, 2021. Retrieved from the Internet: URL:https://jvet-experts.org/doc_end_user/documents/24_Teleconference/wg11/JVET-X2002-v1.zip JVET-X2002-v1.docx [retrieved on Dec. 28, 2021].

Office action received for corresponding Indian Patent Application No. 202447077412, dated Oct. 15, 2025, 7 pages.

Office action received for corresponding Japanese Patent Application No. 2024-557619, dated Oct. 20, 2025, 3 pages of office action and 4 pages of translation available.

* cited by examiner

APPARATUS, A METHOD AND A COMPUTER PROGRAM FOR VIDEO CODING AND DECODING

RELATED APPLICATION

This application claims priority to PCT Patent Application No. PCT/FI2023/050035, filed Jan. 16, 2023, which claims priority from Finland Application No. 20225267, filed on Mar. 29, 2022, which is incorporated herein by reference in its entirety.

TECHNICAL FIELD

The present invention relates to an apparatus, a method and a computer program for video coding and decoding.

BACKGROUND

In video coding, video and image samples are typically encoded using color representations such as YUV or YCbCr consisting of one luminance (luma) and two chrominance (chroma) channels. In these cases the luminance channel, representing mostly the illumination of the scene, is typically coded at certain resolution, while the chrominance channels, representing typically differences between certain color components, are often coded at a second resolution lower than that of the luminance signal. The intention of this kind of a differential representation is to decorrelate the color components and be able to compress the data more efficiently.

In Versatile Video Coding (VVC/H.266) standard, a Cross-Component Linear Model (CCLM) is used as a linear model for predicting the samples in the chroma channels (e.g. Cb and Cr). The model parameters are derived based on the reconstructed samples in the neighbourhood of the chroma block, the co-located neighboring samples in the luma block as well as the reconstructed samples inside the co-located luma block.

The aim of the model is to find the correlation of samples between two or more channels. However, the first-order linear model of CCLM method is not adequate to model the spatial correlations (such as textures or surfaces) between luma and chroma samples, and consequently, the performance is sub-optimal.

SUMMARY

Now in order to at least alleviate the above problems, an enhanced method for achieving a better correlation between the luma and chroma channels is introduced herein.

The scope of protection sought for various embodiments of the invention is set out by the independent claims. The embodiments and features, if any, described in this specification that do not fall under the scope of the independent claims are to be interpreted as examples useful for understanding various embodiments of the invention.

A method according to a first aspect comprises receiving an image block unit of a frame, the image block unit comprising samples in color channels comprising at least one chrominance channel and one luminance channel; reconstructing samples of said luminance channels of the image block unit; determining a reference area for predicting samples of at least one color channel of the image block unit, wherein said reference area comprises one or more of reference samples in a neighboring block in current color channel/frame, in the neighboring of a co-located block in reference color channel/frame; and/or inside the co-located block in reference color channel/frame; determining filter coefficients of a filter for said predicting based on the reference samples and a shape of the filter; and predicting samples of at least one color channel of the image block unit by performing a convolution between the samples of said luminance channels and the filter coefficients.

An apparatus according to a second aspect comprises means for receiving an image block unit of a frame, the image block unit comprising samples in color channels comprising at least one chrominance channel and one luminance channel; means for reconstructing samples of said luminance channel of the image block unit; means for determining a reference area for predicting samples of at least one color channel of the image block unit, wherein said reference area comprises one or more of reference samples in a neighboring block in current color channel/frame, in the neighboring of a co-located block in reference color channel/frame; and/or inside the co-located block in reference color channel/frame; means for determining filter coefficients of a filter for said predicting based on the reference samples and a shape of the filter; and means for predicting samples of at least one color channel of the image block unit by performing a convolution between the samples of said luminance channels and the filter coefficients.

According to an embodiment, the apparatus comprises means for downsampling the samples of said luminance channels to correspond to a size of the samples of the chrominance samples prior to determining the filter coefficients.

According to an embodiment, said means for determining the filter coefficients comprise means for obtaining statistics from the reference samples for linear regression based on the shape of the filter; and means for obtaining the filter coefficients by applying a linear regression method on the obtained statistics.

According to an embodiment, said statistics comprise an auto-correlation matrix and a cross-correlation vector.

According to an embodiment, the shape of the filter is a 1-dimensional (1D-) vector of the filter coefficients or a 2-dimensional (2D-) array of the filter coefficients.

According to an embodiment, the apparatus comprises means for applying auxiliary parameters from outside of the shape of the filter into said convolution.

According to an embodiment, the apparatus comprises means for inputting to the filter a luma sample co-located with an output chroma sample, at least one luma sample above the co-located sample, at least one luma sample below the co-located sample, at least one luma sample left of the co-located sample, at least one luma sample right of the co-located sample and a bias term.

According to an embodiment, the apparatus comprises means for inputting to the filter a value determined by applying a non-linear function on the value of the co-located sample.

According to an embodiment, the apparatus comprises means for storing the filter coefficients in a memory; and means for receiving an indication from an encoder to reuse at least a subset of previously stored filter coefficients for predicting samples of at least one color channel of the current image block unit.

According to an embodiment, the apparatus comprises means for determining samples outside the reference area; means for obtaining statistics from the samples outside the reference area for linear regression based on the shape of the filter; means for obtaining the filter coefficients by applying a linear regression method on the obtained statistics; and means for storing the filter coefficients in the memory.

According to an embodiment, the apparatus comprises means for replacing any missing downsampled luminance sample by a zero-valued sample.

According to an embodiment, the apparatus comprises means for determining the samples not belonging to any object or texture inside said image block unit; and means for removing said samples from the reference area.

The apparatuses and the computer readable storage mediums stored with code thereon, as described above, are thus arranged to carry out the above methods and one or more of the embodiments related thereto.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
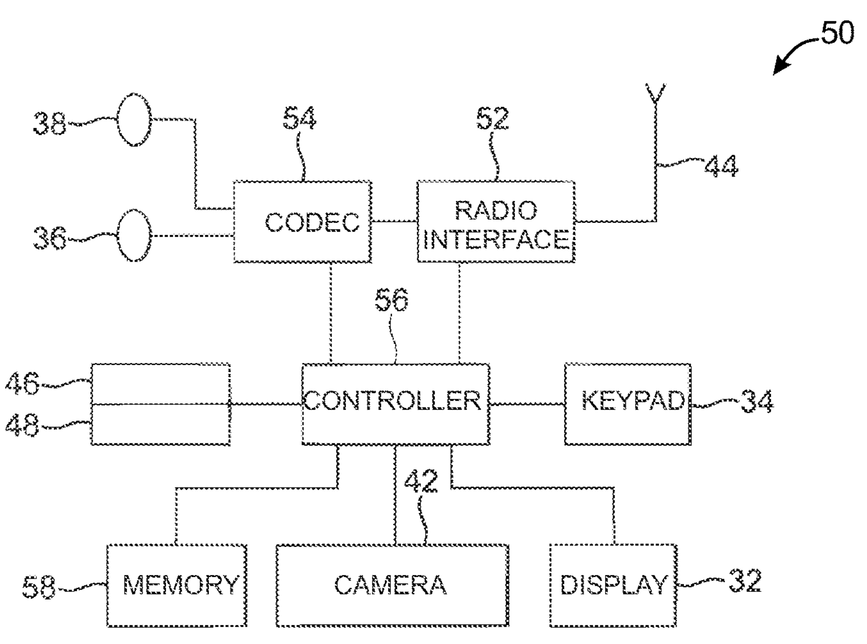
FIG. 1 shows schematically an electronic device employing embodiments of the invention.
Figure 2:
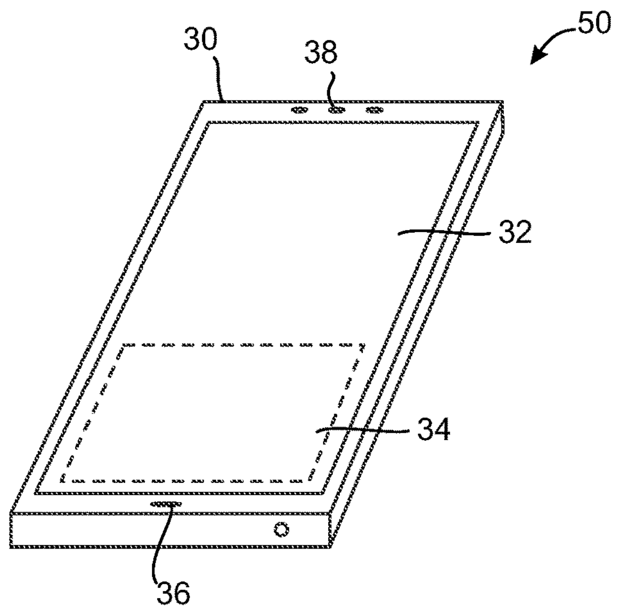
FIG. 2 shows schematically a user equipment suitable for employing embodiments of the invention.

The following describes in further detail suitable apparatus and possible mechanisms for prediction of chroma samples. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
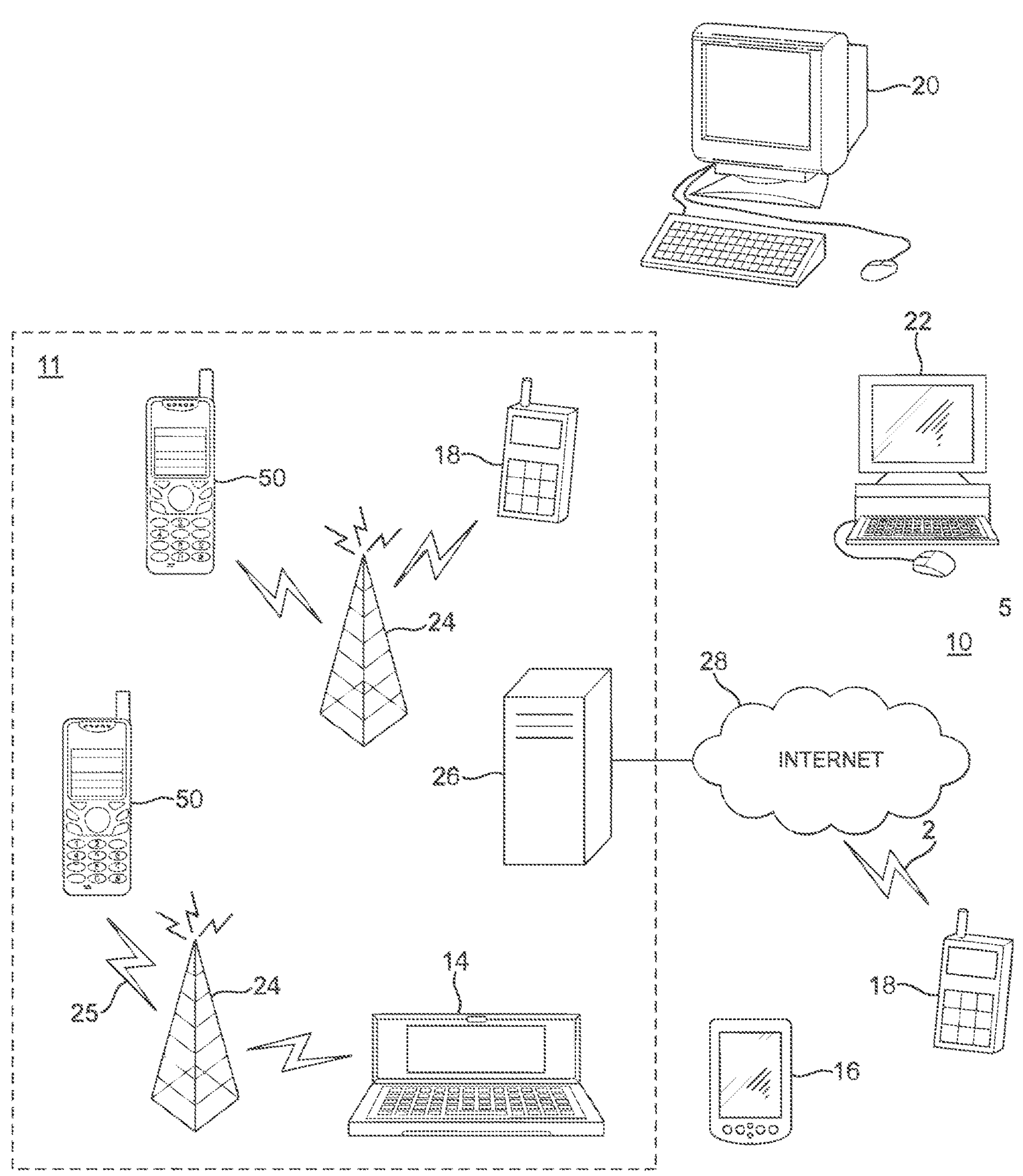
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Motion compensation can be performed either with full sample or sub-sample accuracy. In the case of full sample accurate motion compensation, motion can be represented as a motion vector with integer values for horizontal and vertical displacement and the motion compensation process effectively copies samples from the reference picture using those displacements. In the case of sub-sample accurate motion compensation, motion vectors are represented by fractional or decimal values for the horizontal and vertical components of the motion vector. In the case a motion vector is referring to a non-integer position in the reference picture, a sub-sample interpolation process is typically invoked to calculate predicted sample values based on the reference samples and the selected sub-sample position. The sub-sample interpolation process typically consists of horizontal filtering compensating for horizontal offsets with respect to full sample positions followed by vertical filtering compensating for vertical offsets with respect to full sample positions. However, the vertical processing can be also be done before horizontal processing in some environments.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4A:
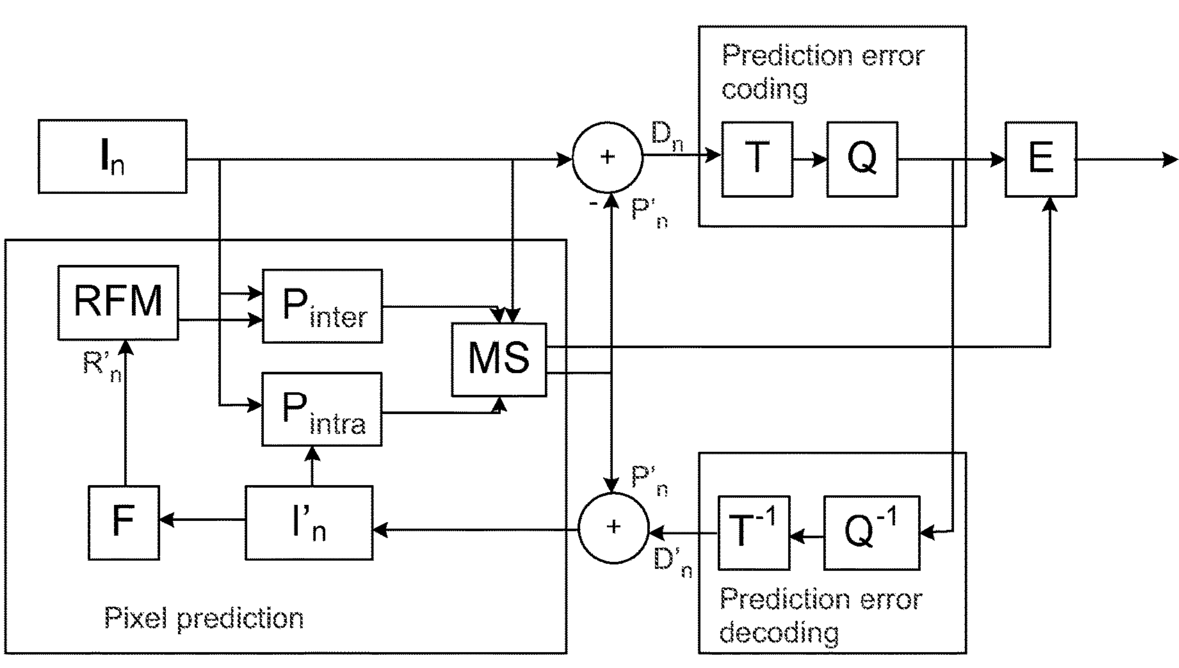
FIGS. 4*a* and 4*b* show schematically an encoder and a decoder suitable for implementing embodiments of the invention.
Figure 4B:
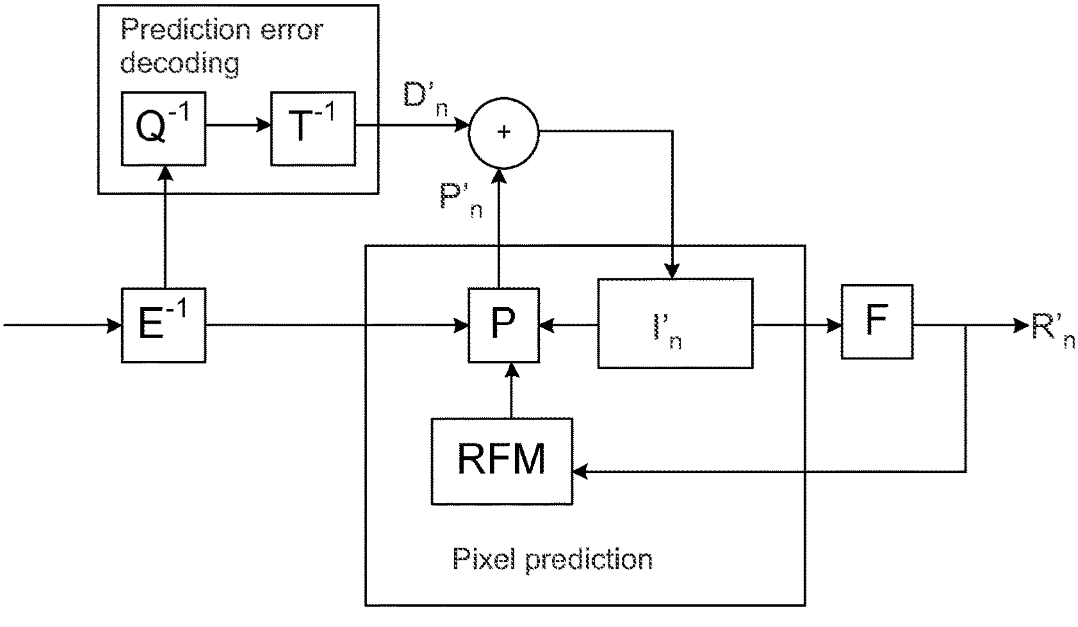

FIGS. 4*a* and 4*b* show an encoder and a decoder suitable for employing embodiments of the invention. A video codec consists of an encoder that transforms an input video into a compressed representation suited for storage/transmission and a decoder that can decompress the compressed video representation back into a viewable form. Typically, the encoder discards and/or loses some information in the original video sequence in order to represent the video in a more compact form (that is, at lower bitrate). An example of an encoding process is illustrated in FIG. 4*a*. FIG. 4*a* illustrates an image to be encoded ($I^n$); a predicted representation of an image block ($P'^n$); a prediction error signal ($D^n$); a reconstructed prediction error signal ($D'^n$); a preliminary reconstructed image ($I'^n$); a final reconstructed image ($R'^n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F).

An example of a decoding process is illustrated in FIG. 4*b*. FIG. 4*b* illustrates a predicted representation of an image block ($P'^n$); a reconstructed prediction error signal ($D'^n$); a preliminary reconstructed image ($I'^n$); a final reconstructed image ($R'^n$); an inverse transform ($T^{-1}$); an inverse quantization ($Q^{-1}$); an entropy decoding ($E^{-1}$); a reference frame memory (RFM); a prediction (either inter or intra) (P); and filtering (F).

Many hybrid video encoders encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate). Video codecs may also provide a transform skip mode, which the encoders may choose to use. In the transform skip mode, the prediction error is coded in a sample domain, for example by deriving a sample-wise difference value relative to certain adjacent samples and coding the sample-wise difference value with an entropy coder.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range, three-dimensional, and screen content coding extensions which may be abbreviated SHVC, MV-HEVC, REXT, 3D-HEVC, and SCC, respectively.

Versatile Video Coding (VVC) (MPEG-I Part 3), a.k.a. ITU-T H.266, is a video compression standard developed by the Joint Video Experts Team (JVET) of the Moving Picture Experts Group (MPEG), (formally ISO/IEC JTC1 SC29 WG11) and Video Coding Experts Group (VCEG) of the International Telecommunication Union (ITU) to be the successor to HEVC/H.265.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC-hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:

- Luma (Y) only (monochrome).
- Luma and two chroma (YCbCr or YCgCo).
- Green, Blue and Red (GBR, also known as RGB).
- Arrays representing other unspecified monochrome or tri-stimulus color samplings (for example, YZX, also known as XYZ).

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

- In monochrome sampling there is only one sample array, which may be nominally considered the luma array.
- In 4:2:0 sampling, each of the two chroma arrays has half the height and half the width of the luma array.
- In 4:2:2 sampling, each of the two chroma arrays has the same height and half the width of the luma array.
- In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUS).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1-1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as case of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) or along a coded unit of a bitstream (e.g. indicating along a coded tile) may be used in claims and described embodiments to refer to out-of-band transmission, signaling, or storage in a manner that the out-of-band data is associated with the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively.

A SEI NAL unit may contain one or more SEI messages, which are not required for the decoding of output pictures but may assist in related processes, such as picture output timing, rendering, error detection, error concealment, and resource reservation.

A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Motion parameter types or motion information may include but are not limited to one or more of the following types:

- an indication of a prediction type (e.g. intra prediction, uni-prediction, bi-prediction) and/or a number of reference pictures;
- an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or
- an indication of a reference picture type, such as a short-term reference picture and/or a long-term reference picture and/or an inter-layer reference picture (which may be indicated e.g. per reference picture)
- a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);
- a horizontal motion vector component (which may be indicated e.g. per prediction block or per reference index or alike);
- a vertical motion vector component (which may be indicated e.g. per prediction block or per reference index or alike);
- one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);
- coordinates of a block to which the motion parameters and/or motion information applies, e.g. coordinates of the top-left sample of the block in luma sample units;
- extents (e.g. a width and a height) of a block to which the motion parameters and/or motion information applies.

In comparison to the previous video coding standards, Versatile Video Codec (H.266/VVC) introduces a plurality of new coding tools, such as the following:

Intra prediction
- 67 intra mode with wide angles mode extension
- Block size and mode dependent 4 tap interpolation filter
- Position dependent intra prediction combination (PDPC)
- Cross component linear model intra prediction (CCLM)
- Multi-reference line intra prediction
- Intra sub-partitions
- Weighted intra prediction with matrix multiplication Inter-picture prediction
- Block motion copy with spatial, temporal, history-based, and pairwise average merging candidates
- Affine motion inter prediction
- sub-block based temporal motion vector prediction
- Adaptive motion vector resolution
- 8×8 block-based motion compression for temporal motion prediction
- High precision (1/16 pel) motion vector storage and motion compensation with 8-tap interpolation filter for luma component and 4-tap interpolation filter for chroma component
- Triangular partitions
- Combined intra and inter prediction
- Merge with MVD (MMVD)
- Symmetrical MVD coding
- Bi-directional optical flow
- Decoder side motion vector refinement
- Bi-prediction with CU-level weight Transform, quantization and coefficients coding
- Multiple primary transform selection with DCT2, DST7 and DCT8
- Secondary transform for low frequency zone
- Sub-block transform for inter predicted residual
- Dependent quantization with max QP increased from 51 to 63
- Transform coefficient coding with sign data hiding
- Transform skip residual coding Entropy Coding
- Arithmetic coding engine with adaptive double windows probability update In loop filter
- In-loop reshaping
- Deblocking filter with strong longer filter
- Sample adaptive offset
- Adaptive Loop Filter Screen content coding:
- Current picture referencing with reference region restriction 360-degree video coding
- Horizontal wrap-around motion compensation High-level syntax and parallel processing
- Reference picture management with direct reference picture list signalling
- Tile groups with rectangular shape tile groups The partitioning in VVC is carried out similarly to HEVC, i.e., each picture is divided into coding tree units (CTUs). A picture may also be divided into slices, tiles, bricks and sub-pictures. CTU may be split into smaller CUs using quaternary tree structure. Each CU may be divided using quad-tree and nested multi-type tree including ternary and binary split. However, there are specific rules to infer partitioning in picture boundaries, and the redundant split patterns are disallowed in nested multi-type partitioning.

In the new coding tools listed above, the cross-component linear model (CCLM) prediction mode is used in the VVC to reduce the cross-component redundancy. Therein, the chroma samples are predicted based on the reconstructed luma samples of the same CU by using a linear model as follows:

$$pred_C(i,j) = \alpha \cdot rec'_L(i,j) + \beta \quad \text{(Eq. 1a)}$$

where $pred_C(i,j)$ represents the predicted chroma samples in a CU and $rec_L'(i,j)$ represents the downsampled reconstructed luma samples of the same CU.

Alternatively, the below equation may be used for CCLM:

$$pred_C(i,j) = \alpha \cdot rec_L'^{(i,j)} \gg k + \beta \quad \text{(Eq. 1b)}$$

where >> operation denotes a bit shifting to right by value k.

The CCLM parameters (a and B) are derived with at most four neighbouring chroma samples and their corresponding down-sampled luma samples. Suppose the current chroma block dimensions are W×H, then W' and H' are set as W'=W, H'=H when LM mode is applied;

W'=W+H when LM-A mode is applied;

H'=H+W when LM-L mode is applied;

Herein, LM-A mode refers to linear model_above, where only the above template (i.e. sample values from neighbouring positions above the CU) is used to calculate the linear model coefficients. To get more samples, the above template is extended to (W+H). LM-L mode, in turn, refers to linear model_left, where only left template (i.e. sample values from neighbouring positions left to the CU) is used to calculate the linear model coefficients. To get more samples, the left template is extended to (H+W). For a non-square block, the above template is extended to W+W, the left template is extended to H+H.

The above neighbouring positions are denoted as S [0,−1] . . . . S [W'−1,−1] and the left neighbouring positions are denoted as S [−1, 0] . . . . S [−1, H'−1]. Then the four samples are selected as S [W'/4,−1], S [3*W'/4,−1], S [−1, H'/4], S [−1, 3*H'/4] when LM mode is applied and both above and left neighbouring samples are available;

S [W'/8,−1], S [3*W'/8,−1], S [5*W'/8,−1], S [7*W'/8,−1] when LM-A mode is applied or only the above neighbouring samples are available;

S [−1, H'/8], S [−1, 3*H'/8], S [−1, 5*H'/8], S [−1, 7*H'/8] when LM-L mode is applied or only the left neighbouring samples are available;

The four neighbouring luma samples at the selected positions are down-sampled and compared four times to find two smaller values: x0A and x1A, and two larger values: x0B and x1B. Their corresponding chroma sample values are denoted as y0A, y1A, y0B and y1B. Then xA, xB, yA and yB are derived as:

$$X_a = (x_A^0 + x_A^1 + 1) \gg 1;\ X_b = (x_B^0 + x_B^1 + 1) \gg 1; \quad \text{(Eq. 2)}$$
$$Y_a = (y_A^0 + y_A^1 + 1) \gg 1;\ Y_b = (y_B^0 + y_B^1 + 1) \gg 1$$

Finally, the linear model parameters a and B are obtained according to the following equations:

$$\alpha = \frac{Y_a - Y_b}{X_a - X_b} \quad \text{(Eq. 3)}$$

$$\beta = Y_b - \alpha \cdot X_b \quad \text{(Eq. 4)}$$

Figure 5:
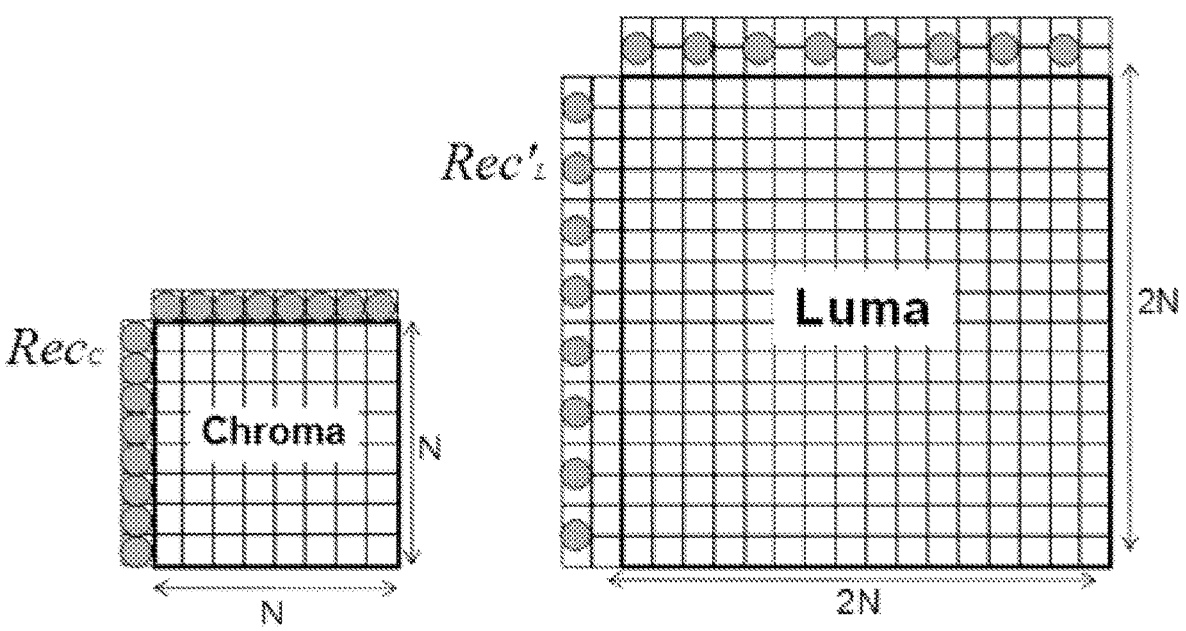
FIG. 5 illustrates locations of the samples used for derivation of parameters for a Cross-Component Linear Model.

FIG. 5 shows an example of the location of the left and above samples and the sample of the current block involved in the CCLM mode.

The division operation to calculate parameter a is implemented with a look-up table. To reduce the memory required for storing the table, the diff value (difference between maximum and minimum values) and the parameter a are expressed by an exponential notation. For example, diff is approximated with a 4-bit significant part and an exponent. Consequently, the table for 1/diff is reduced into 16 elements for 16 values of the significant part as follows:

$$DivTable[\ ] = \{0, 7, 6, 5, 5, 4, 4, 3, 3, 2, 2, 1, 1, 1, 1, 0\} \quad \text{(Eq. 5)}$$

This provides the benefit of both reducing the complexity of the calculation as well as the memory size required for storing the needed tables.

To match the chroma sample locations for 4:2:0 video sequences, two types of downsampling filter are applied to luma samples to achieve 2 to 1 downsampling ratio in both horizontal and vertical directions. The selection of downsampling filter is specified by a SPS level flag. The two downsampling filters are as follows, which are corresponding to "type-0" and "type-2" content, respectively:

$$Rec'_L(i, j) = [rec_L(2i-1, 2j-1) + 2 \cdot rec_L(2i-1, 2j-1) + rec_L(2i+1, 2j-1) + rec_L(2i-1, 2j) + 2 \cdot rec_L(2i, 2j) + rec_L(2i+1, 2j) + 4] \gg 3 \quad \text{(Eq. 6)}$$

$$rec'_L(i, j) = [rec_L(2i, 2j-1) + rec_L(2i-1, 2j) + 4 \cdot rec_L(2i, 2j) + rec_L(2i+1, 2j) + rec_L(2i, 2j+1) + 4] \gg 3 \quad \text{(Eq. 7)}$$

It is noted that only one luma line (general line buffer in intra prediction) is used to make the down-sampled luma samples when the upper reference line is at the CTU boundary.

This parameter computation is performed as part of the decoding process and is not just as an encoder search operation. As a result, no syntax is used to convey the a and B values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 1. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 1

| Chroma | Corresponding luma intra prediction mode | | | | |
|---|---|---|---|---|---|
| prediction mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 2.

TABLE 2

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 2, the first bin indicates whether it is regular (0) or LM modes (1). If it is LM mode, then the next bin indicates whether it is LM_CHROMA (0) or not. If it is not LM_CHROMA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 2 are context coded with its own context model, and the rest bins are bypass coded.

In addition, in order to reduce luma-chroma latency in dual tree, when the 64×64 luma coding tree node is partitioned with Not Split (and intra sub-partitions (ISP) is not used for the 64×64 CU) or QT, the chroma CUs in 32×32/32×16 chroma coding tree node are allowed to use CCLM in the following way:

If the 32×32 chroma node is not split or partitioned QT split, all chroma CUs in the 32×32 node can use CCLM If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

Multi-Model LM (MMLM)

Figure 6A:
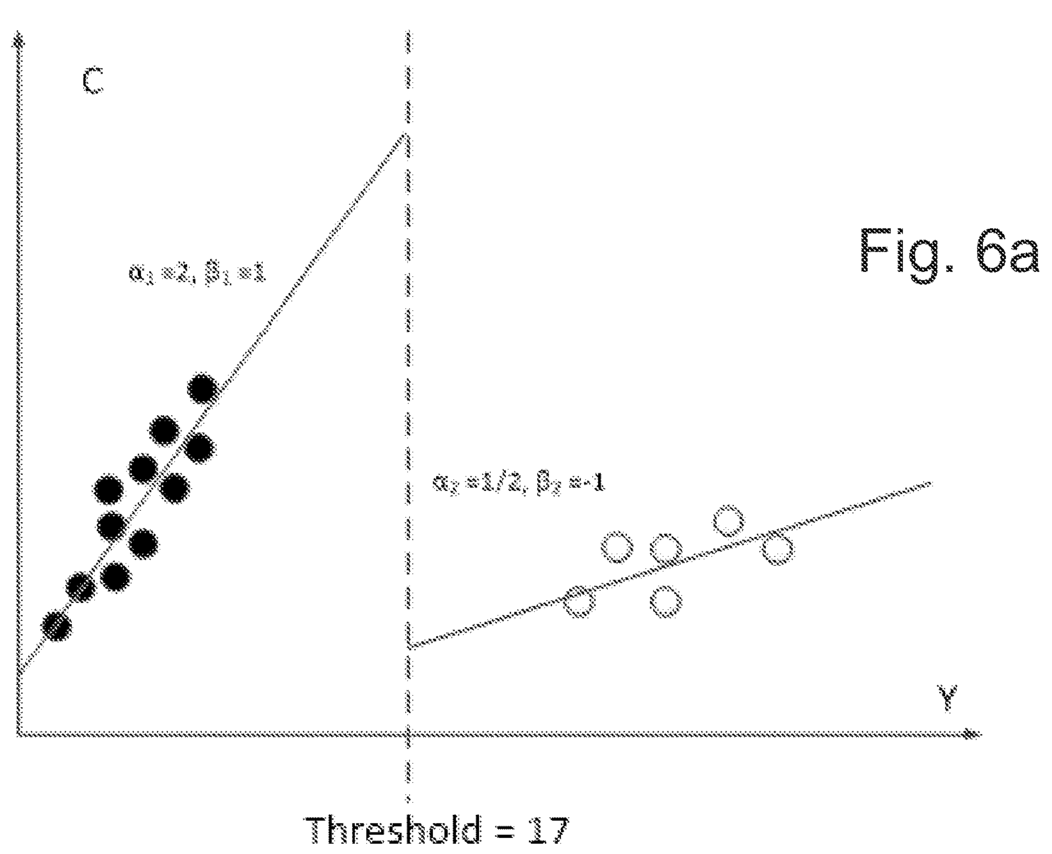
FIGS. 6*a* and 6*b* show examples of classification of luma samples into two classes in the sample domain, and in the spatial domain, respectively.
Figure 6B:
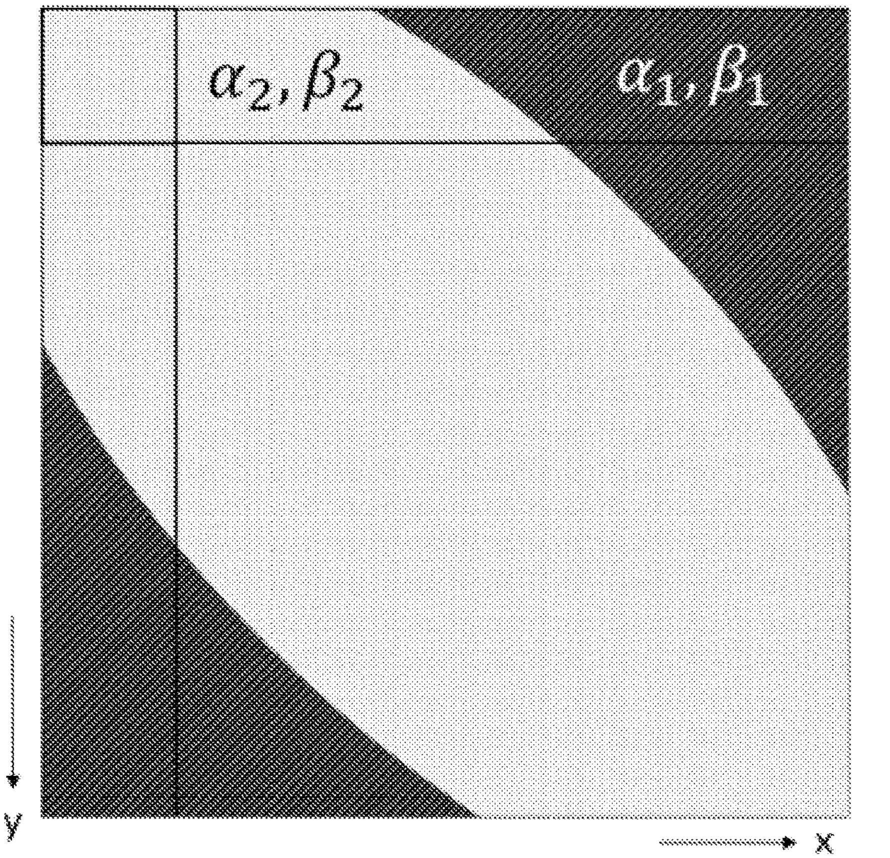

The CCLM included in VVC is extended by adding three Multi-model LM (MMLM) modes. In each MMLM mode, the reconstructed neighbouring samples are classified into two classes using a threshold which is the average of the luma reconstructed neighbouring samples. The linear model of each class is derived using the Least-Mean-Square (LMS) method. For the CCLM mode, the LMS method is also used to derive the linear model. FIGS. 6*a* and 6*b* illustrate two luma-to-chroma models obtained for luma (Y) threshold of 17 in sample domain and spatial domain, respectively. Each luma-to-chroma model has its own linear model parameters a and B. As can be seen in FIG. 6*b*, each luma-to-chroma model corresponds to a spatial segmentation of the content (i.e., they correspond to different objects or textures in the scene).

Multiple Reference Line (MRL) Intra Prediction

Figure 7:
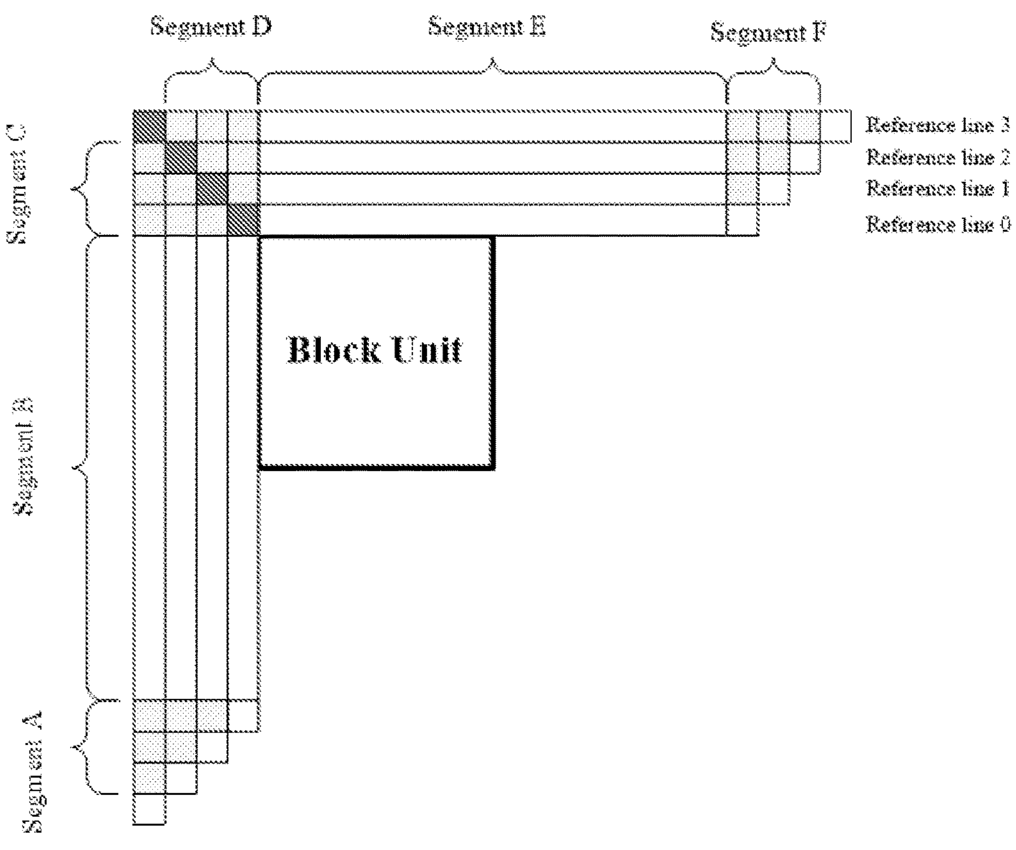
FIG. 7 illustrates an example of four reference lines neighboring to a prediction block.

Multiple reference line (MRL) intra prediction uses more reference lines for intra prediction. In FIG. 7, an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signalled and used to generate intra predictor. For reference line idx, which is greater than 0, only include additional reference line modes in MPM list and only signal mpm index without remaining mode. The reference line index is signalled before intra prediction modes, and Planar mode is excluded from intra prediction modes in case a nonzero reference line index is signalled.

MRL is disabled for the first line of blocks inside a CTU to prevent using extended reference samples outside the current CTU line. Also, PDPC is disabled when additional line is used. For MRL mode, the derivation of DC value in DC intra prediction mode for non-zero reference line indices are aligned with that of reference line index 0. MRL requires the storage of 3 neighboring luma reference lines with a CTU to generate predictions. The CCLM tool also requires 3 neighboring luma reference lines for its down-sampling filters. The definition of MLR to use the same 3 lines is aligned as CCLM to reduce the storage requirements for decoders.

Intra Sub-Partitions (ISP)

The intra sub-partitions (ISP) divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. It has been noted that the M×128 (with M≤64) and 128×N (with N≤64) ISP blocks could generate a potential issue with the 64×64 VDPU. For example, an M×128 CU in the single tree case has an M×128 luma TB and two corresponding M/2×64 chroma TBs. If the CU uses ISP, then the luma TB will be divided into four M×32 TBs (only the horizontal split is possible), each of them smaller than a 64×64 block. However, in the current design of ISP chroma blocks are not divided. Therefore, both chroma components will have a size greater than a 32×32 block. Analogously, a similar situation could be created with a 128×N CU using ISP. Hence, these two cases are an issue for the 64×64 decoder pipeline. For this reason, the CU sizes that can use ISP is restricted to a maximum of 64×64. All sub-partitions fulfil the condition of having at least 16 samples.

Matrix Weighted Intra Prediction (MIP)

Figure 8:
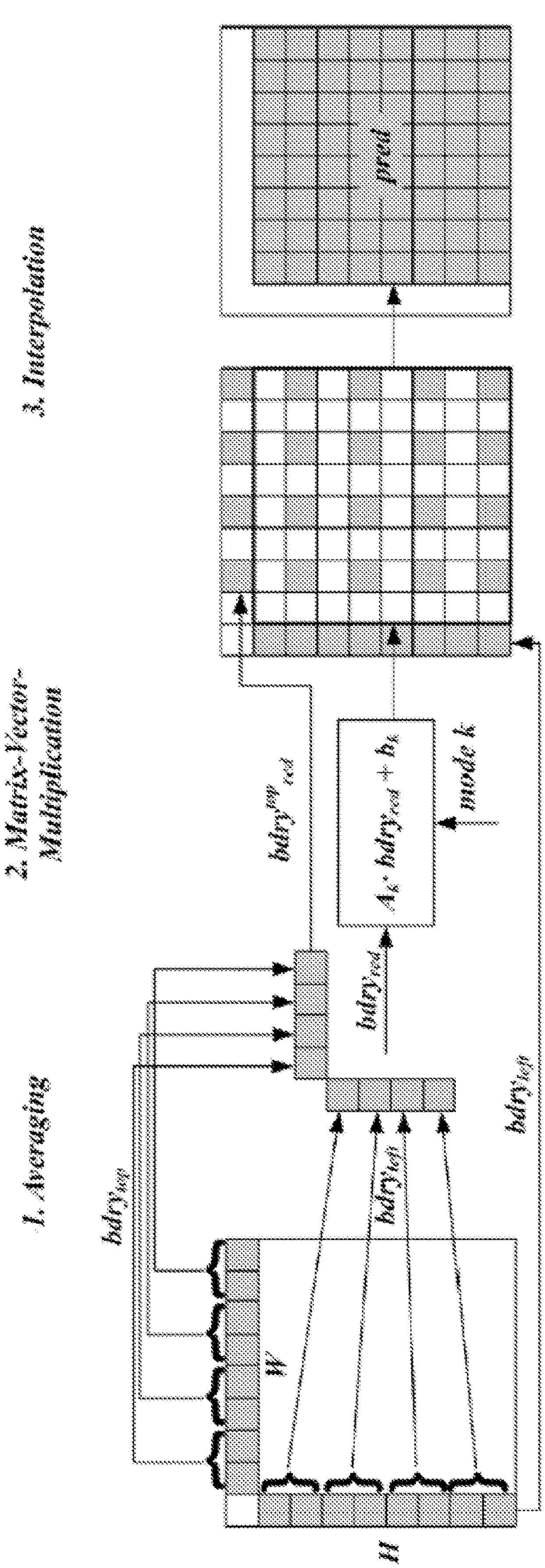
FIG. 8 illustrates a matrix weighted intra prediction process.

Matrix weighted intra prediction (MIP) method is a newly added intra prediction technique into VVC. For predicting the samples of a rectangular block of width W and height H, matrix weighted intra prediction (MIP) takes one line of H reconstructed neighbouring boundary samples left of the block and one line of W reconstructed neighbouring boundary samples above the block as input. If the reconstructed samples are unavailable, they are generated as it is done in the conventional intra prediction. The generation of the prediction signal is based on the following three steps, which are averaging, matrix vector multiplication and linear interpolation as shown in FIG. 8.

Inter Prediction in VVC

A merge list may include the following candidates:

a) Spatial MVP from spatial neighbour CUs
b) Temporal MVP from collocated CUs
c) History-based MVP from a FIFO table
d) Pairwise average MVP (using the candidates already in the list)
c) Zero MVs.

Merged mode width motion vector difference (MMVD) is to signal MVDs and a resolution index after signaling merge candidate. In Symmetric MVD, motion information of list-1 are derived from motion information of list-0 in bi-prediction case.

In Affine prediction, several motion vectors are indicated/signaled for different corners of a block, which are used to derive the motion vectors of sub-block. In affine merge, affine motion information of a block is generated based on the normal or affine motion information of the neighboring blocks.

In Sub-block-based temporal motion vector prediction, motion vectors of subblocks of the current block are predicted from a proper subblocks in the reference frame which are indicated by the motion vector of a spatial neighboring block (if available).

In Adaptive motion vector resolution (AMVR), precision of MVD is signaled for each CU.

In Bi-prediction with CU-level weight, an index indicated the weight values for weighted average of two prediction block. Bi-directional optical flow (BDOF) refines the motion vectors in bi-prediction case. BDOF generates two prediction blocks using the signaled motion vectors. Then a motion refinement is calculated to minimize the error between two prediction blocks using their gradient values. The final prediction blocks are refined using the motion refinement and gradient values.

Thus, it may be concluded that the aim of the linear model of CCLM method used in VVC/H.266 is to find the correlation of samples between two or more chroma channels (e.g. Cb and Cr) by deriving the model parameters based on the reconstructed samples in the neighborhood of the chroma block, the co-located neighboring samples in the luma block as well as the reconstructed samples inside the co-located luma block.

However, the first-order linear model of CCLM is not adequate to model the spatial correlations (such as textures or surfaces) between luma and chroma samples.

Now an improved method for achieving a cross-component prediction, which is more suitable for modelling spatial correlations between luma and chroma samples is introduced.

Figure 9:
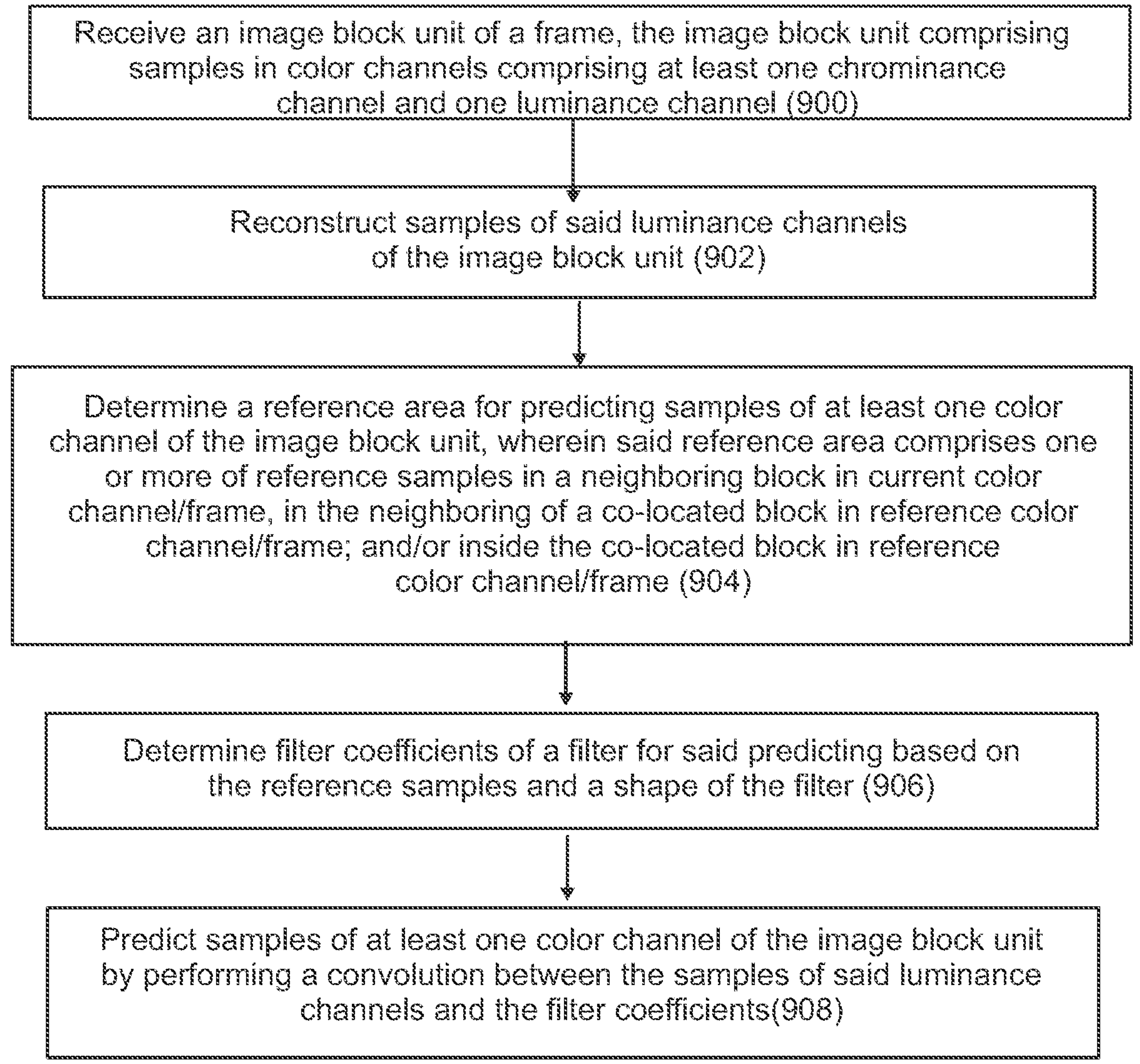
FIG. 9 shows a flow chart of a method for predicting samples in at least one color channel according to an embodiment of the invention.

A method according to an aspect is shown in FIG. 9, where the method comprises receiving (900) an image block unit of a frame, the image block unit comprising samples in color channels comprising at least one chrominance channel and one luminance channel; reconstructing (902) samples of said luminance channels of the image block unit; determining (904) a reference area for predicting samples of at least one color channel of the image block unit, wherein said reference area comprises one or more of reference samples in a neighboring block in current color channel/frame, in the neighboring of a co-located block in reference color channel/frame; and/or inside the co-located block in reference color channel/frame; determining (906) filter coefficients of a filter for said predicting based on the reference samples and a shape of the filter; and predicting (908) samples of at least one color channel of the image block unit by performing a convolution between the samples of said luminance channels and the filter coefficients.

Thus, the method predicts chroma samples using a convolution between a set of input data and a decoder-side derived filter kernel. The shape and the number of coefficients of the filter are agreed by both the encoder and the decoder. The input data to the convolution can be specified in a wide variety of ways and may include, for example, luma samples co-located with the chroma samples, neighboring co-located luma samples or any other configuration of luma samples. For the filter coefficient derivation, co-located reference sample areas comprising reconstructed luma and chroma samples are defined for both luma and chroma prediction, where the reference samples may contain any chroma and luma samples that have been reconstructed by both the encoder and the decoder. Once the reference samples are determined, the filter coefficients are derived based on the reference samples and the shape of the filter kernel. Finally, the predicted chroma block may be calculated by convolving the luma samples with the filter kernel.

Accordingly, the method enables the usage of 2D filter kernels, thereby enhancing the modelling of spatial correlations (such as textures or surfaces) between luma and chroma samples.

According to an embodiment, the method comprises downsampling the samples of said luminance channels to correspond to a size of the samples of the chrominance samples prior to determining the filter coefficients.

Figure 10:
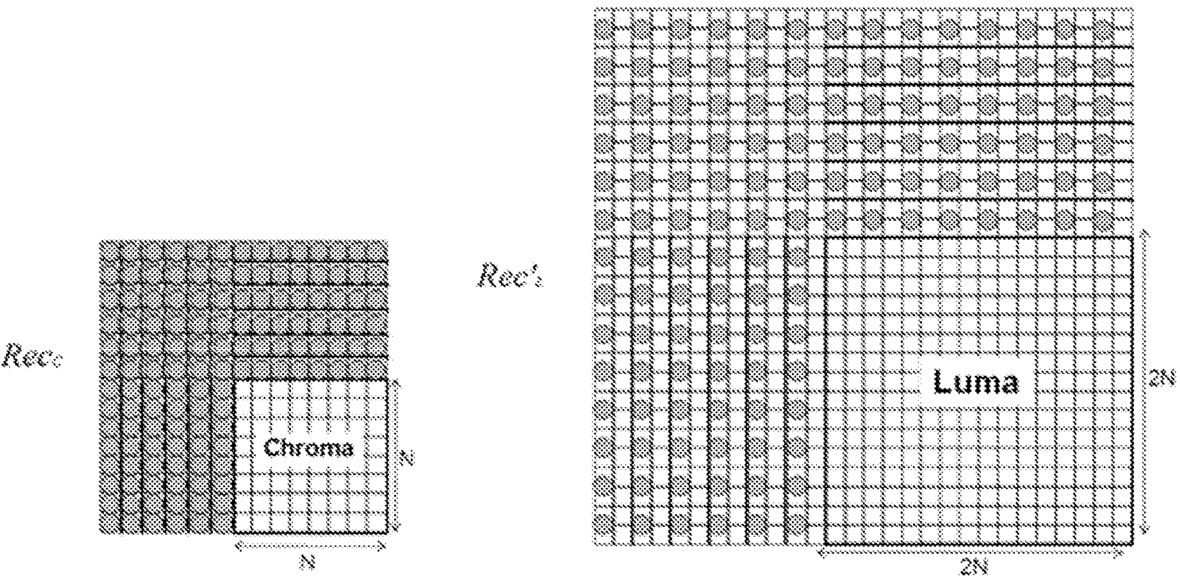
FIG. 10 shows an example of co-located reference sample areas consisting of reconstructed luma and chroma samples defined for both luma and chroma according to an embodiment of the invention.

FIG. 10 shows an example of co-located reference sample areas consisting of reconstructed luma and chroma samples defined for both luma and chroma, where the typically used 4:2:0 chroma down-sampling has been applied. For the purpose of determining the filter coefficients for predicting chroma samples, at least the corresponding reference luma samples may be downsampled to the dimensions of the chroma samples. The reference sample area for a given block can be, for example, six lines above and left as shown in FIG. 10, but it is noted that any number of reference lines that can be realized by both the encoder and the decoder can be used.

According to an embodiment, the determining of the filter coefficients comprises obtaining statistics from the reference samples for linear regression based on the shape of the filter; and obtaining the filter coefficients by applying a linear regression method on the obtained statistics.

Once the reference samples are determined, the filter coefficients can be derived by scanning the luma and chroma samples of the reference area and collect available statistics from the reference samples based on the filter shape and solving the filter coefficients by applying some linear regression method on the obtained statistics. Herein, different types of linear regression tools, such as ordinary least-squares estimation, orthogonal matching pursuit, optimized orthogonal matching pursuit, ridge regression, or least absolute shrinkage and selection operator, may be used.

According to an embodiment, said statistics comprise an auto-correlation matrix and a cross-correlation vector. Thus, based on the reference samples and the shape of the filter kernel, an auto-correlation matrix and a cross-correlation vector may be defined, whereupon the filter coefficients may be solved, for example, by minimizing squared-error (or any other metric) based on the auto-correlation matrix and the cross-correlation vector.

According to an embodiment, the shape of the filter is a 1-dimensional (1D-) vector of the filter coefficients or a 2-dimensional (2D-) array of the filter coefficients.

Figure 11:
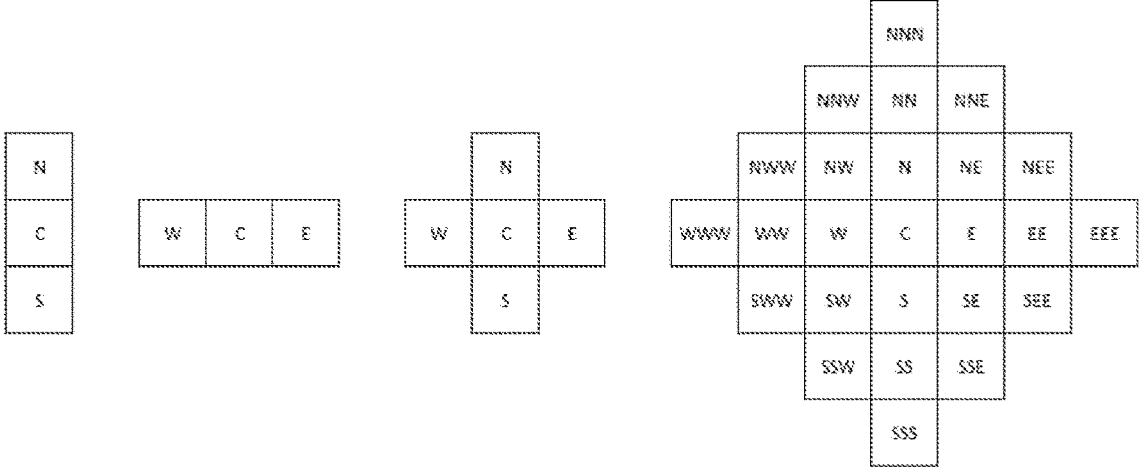
FIG. 11 shows various examples of the dimensions of the filter kernel according to an embodiment of the invention.

FIG. 11 shows various examples of the dimensions of the filter kernel, which may be, for example, 1×3 (1D vertical), 3×1 (1D horizontal), 3×3, 7×7 or any dimensions. The filter kernel may be shaped as a cross or a diamond, as shown in FIG. 11, or as any given shape by selecting only a subset of all possible kernel locations. When referring to the samples within the filter kernel the following notation is used: north (above), cast (right), south (below), west (left) and center, as illustrated in FIG. 11 using the letters N, E, S, W, C.

Let us define the (possibly down-sampled) luma samples as a 2D array Y (x, y) indexed using horizontal x-coordinate and vertical y-coordinate. Let us also define the co-located chroma samples as a 2D array C (x, y) and the filter kernel (i.e., coefficients) as 3×3 array F (i,j). On a sample level, the convolution between Y and F can then be defined as:

$$C(x, y) = \sum_{j=-1}^{j=1} \sum_{i=-1}^{i=1} Y(x+i,\ y+j) \cdot F(i+1,\ j+1).$$

According to an embodiment, the method comprises applying auxiliary parameters from outside of the shape of the filter into said convolution.

Other parameters or data terms outside of the filter kernel can be applied as additional terms in the linear combination. Such terms can be, for example, a bias term, spatial coordinates, recursively reconstructed chroma samples, or a non-linear term, such as the square root of the co-located luma sample or the co-located luma sample value to the power of two. Generally, the non-linear term can be any non-linear function applied on any of the reconstructed samples or other available data. More than one non-linear term can be used to be able to capture different kinds of non-linear dependencies between luma and chroma sample values.

The introduction of parameters or data terms outside of the filter kernel, especially the non-linear terms, even further enhances the modelling of spatial correlations between luma and chroma samples.

When using said auxiliary parameters, such as the non-linear square-root term, the above convolution becomes $$C(x, y) = \left( \sum_{j=-1}^{j=1} \sum_{i=-1}^{i=1} Y(x+i,\ y+j) \cdot F(i+1,\ j+1) \right) + \hat{F}(0) \cdot \sqrt{Y(x, y)},$$

where $$\hat{F}$$

are filter coefficients that reside outside of the 2D filter kernel, but which have been obtained as a part of the system of linear equations that were used to solve the 2D filter coefficients as described above.

Another example of using said auxiliary parameters is to add the bias term to the convolution:

$$C(x, y) = \left( \sum_{j=-1}^{j=1} \sum_{i=-1}^{i=1} Y(x+i,\ y+j) \cdot F(i+1,\ j+1) \right) + \hat{F}(0) + \hat{F}(1) \cdot \sqrt{Y(x, y)}.$$

As a further example, luma sample squared can be used instead or in addition to the square root term as follows:

$$C(x, y) = \left( \sum_{j=-1}^{j=1} \sum_{i=-1}^{i=1} Y(x+i, y+j) \cdot F(i+1, j+1) \right) + \hat{F}(0) + \hat{F}(1) \cdot Y(x, y)^2.$$

Both F and $$\hat{F}$$

(i.e., CCCM coefficients) are obtained using reconstructed samples in the near vicinity of the chroma block. However, CCCM coefficients derived from more faraway samples may need to be considered in cases where the immediate neighbourhood is unable to describe the cross-component relation between luma and chroma.

According to an embodiment, the method comprises storing the filter coefficients in a memory; and receiving an indication from an encoder to reuse at least a subset of previously stored filter coefficients for predicting samples of at least one color channel of the current image block.

Thus, the encoder and decoder may store CCCM coefficients into memory allowing all or some subset of so far obtained CCCM coefficients to be tested at the encoder. Once a suitable set of CCCM coefficients has been found, an index identifying these coefficients is signalled to the decoder. This type of re-use of earlier CCCM coefficients can be referred to as history based CCCM.

According to an embodiment, the method comprises determining samples outside the reference area; obtaining statistics from the samples outside the reference area for linear regression based on the shape of the filter; obtaining the filter coefficients by applying a linear regression method on the obtained statistics; and storing the filter coefficients in the memory.

To further increase the count of filter coefficient sets, the encoder and decoder may also include into memory coefficients from non-CCCM blocks by scanning the luma and chroma samples of the reference area and collect available statistics from the reference samples based on the filter shape and solving the filter coefficients by applying some linear regression method on the obtained statistics. This may be applied to all or some subset of non-CCCM chroma blocks. The resulting CCCM coefficients are stored in the memory.

Again, an auto-correlation matrix and a cross-correlation vector may be defined based on the reference samples and the shape of the filter kernel, whereupon the filter coefficients may be solved, for example, by minimizing squared-error (or any other metric) based on the auto-correlation matrix and the cross-correlation vector. Further, it is possible to downsample the samples outside the reference area to correspond to a size of the samples of the chrominance samples prior to determining the filter coefficients.

To further improve the diversity of the obtained history based CCCM coefficients, the encoder and decoder may also carry out the above steps of downsampling, obtaining the statistics and obtaining the filter coefficients on CCCM blocks as well. The resulting CCCM coefficients can be used to overwrite the earlier CCCM coefficients, or they can be stored as additional CCCM coefficients.

A more refined chroma prediction can be obtained by merging the locally derived CCCM coefficients with the history based CCCM. Let us call the history based CCCM coefficients as $F_h$ and $$\hat{F}_h$$

. A merging weight w is defined as 0<w<1.0, and the weighted CCCM coefficients become $F_w = wF_n + (1-w)F$ and $$\hat{F}_w = w\hat{F}_h + (1-w)\hat{F}$$

If the history based CCCM filter structure does not match the locally derived CCCM filter structure, this weighting can also be applied after the convolution on the reconstructed chroma samples. The best w is searched at the encoder-side and signalled to the decoder. Multiple history based and/or locally derived CCCM coefficients can be merged by searching and signalling multiple $w_i$ weights.

When calculating the model parameters or filter coefficients F and $$\hat{F}$$

different selections can be done depending on whether operating in a single tree mode (with three color components represented by a single coding unit) or in a dual tree mode (with a separate coding unit for luma and a separate coding unit for the two chroma components).

In dual tree mode where luma samples are typically available for a spatial area covering a complete coding tree unit consisting of multiple coding units, luma samples below(S) and to the right (E) of the chroma coding unit may be available. In such cases, said luma samples can be advantageously used for both filter coefficient derivation and in the actual sample prediction process which maps luma sample values to chroma sample values with the convolution operation.

In single tree case however, such luma samples are not available and may not be used by model creation or sample prediction operations. The luma samples of the current coding unit may be used in the CCCM model creation, for example if the south(S) sample below the center (C) sample is included in the filter kernel, that south sample can be obtained from inside the current coding unit when collecting statistics for a border sample immediately above the current coding unit. However, that may not be desirable considering implementation parallelism aspects, since that kind of an operation requires the luma samples of the current coding unit to be available when generating the CCCM model for the chrominance components; thus, preventing luma sample decoding to be performed in parallel with the CCCM model creation. In order to avoid that, using luma samples inside the current coding unit can be allowed for dual tree operation and disallowed for single tree operation. Or alternatively, it can be signalled in the video bitstream if luma sample within the current coding unit are used in CCCM model creation to allow a decoder to configure itself for parallel or sequential processing of luma and chroma.

According to an embodiment, the method comprises replacing any missing downsampled luminance sample by a zero-valued sample.

In both CCCM model creation and CCCM sample prediction processes, some of the possibly downsampled luma samples required by the convolution kernel may not be available. For example, some samples may be outside of the picture boundaries or belong to areas not decoded yet. In those cases, such samples may be generated in different ways. For example, unavailable samples may be substituted by the closest available samples. Such process is typically referred to as padding. In CCCM model creation phase, depending on the approach selected for deriving the CCCM coefficients, it is sometimes beneficial to use zero valued samples for the unavailable samples instead of traditional padding means. This can be especially beneficial when using auto-correlation matrix-based approaches for coefficient estimation as a zero valued input would introduce no update to such matrix thus omitting the potential negative effects of replicating samples in the reference area boundaries.

There can be additional bitstream signalling to update the CCCM model derived from the decoded samples. For example, an update term to be added to the center luma sample location coefficient F (1, 1) can be signalled and a decoder may perform additional adjustments to the other coefficient based on the decoded update term.

Different measures can be taken to balance the computational requirements of different kinds of coding units. For example, the number and locations of reference samples used in the CCCM model creation process can be determined based on the size of the coding unit, the number and spatial positions of coefficients in the CCCM model can be adjusted based on the size of the coding unit, or the number and spatial positions of coefficients in the CCCM model can be adjusted based on the number of CCCM models needed within one coding unit.

Similarly, different measures can be taken to balance the memory and memory bandwidth needs of the CCCM process. For example, in some environments it may be beneficial to restrict the reference lines used above a coding tree unit. In such case a different amount of reference lines can be used for the CCCM model creation depending on whether the sample block to be predicted is at or close to the top border of a coding tree unit or further away from that border. As examples, the number of reference lines needed above the coding tree unit can be limited to three, or it can be limited to two, or it can be limited to one line of samples.

According to an embodiment, the method comprises determining the samples not belonging to any object or texture inside said image block unit; and removing said samples from the reference area.

There can be an outlier removal process applied for the reference area samples of luma and chroma for determining the samples that do not belong to the objects or textures inside the block. Such process may be done based on determining certain statistics or characteristics from the co-located luma samples inside the block. For example, one or more of the co-located block's luma samples with minimum and maximum intensity values may be used as metrics for removing the reference area luma and possibly corresponding chroma samples from the CCCM parameter derivation process. Alternatively, the said minimum and maximum values may be used for clipping the reference area samples that are exceeding the intensity range of the samples inside the block. In another approach, a clustering and or classification methods may be used for the co-located luma samples in the block for determining the characteristics of the samples and accordingly the reference area samples that are matching with the determined characteristics of the co-located luma samples is then used for CCCM parameter derivation.

Instead of one CCCM model, multiple CCCM model can be derived to a single block of chrominance samples. In such a case, different kinds of conditions can be used to select with CCCM model to apply for each chroma sample. For example, the average luma value of the reference samples can be used as a threshold value if there are two CCCM models for a certain chroma block, and if a co-located luma sample is smaller than the threshold a first CCCM model can be selected for predicting a chroma samples, otherwise the second CCCM model can be used for that chroma sample. Also, different conditions can be used to enable a block to have multiple CCCM models, for example multiple models can only be allowed if the chroma block is having at least a specified number of samples or at least of specified number of reference samples is used for that block. This kind of a selection can be beneficial as small blocks may not be able to substantially benefit from multiple CCCM models, but there is typically additional signaling and computational requirements associated with multiple models making those relatively less beneficial to smaller blocks compared to larger blocks.

In the following, embodiments relating to various implementation options for the decoder to derive and/or apply various parameters relating to the prediction model are disclosed.

According to an embodiment, a set of chroma samples is predicted using a filtering operation which takes as an input at least a luma sample co-located with a chroma sample, another luma sample in a different position, and a term derived from a luma sample or multiple luma samples using a non-linear operation; wherein the filtering operation outputs a predicted chroma sample.

According to an embodiment, any number of CCCM filters may be applied when predicting the chroma samples. For example, the chroma samples may be divided into two or more classes with each class using its own CCCM coefficients like in the multi-model CCLM.

According to an embodiment, the non-linear term of the convolution is defined as a non-linear function of any reconstructed or otherwise available data, such as reconstructed luma or chroma samples.

The non-linear function used in the non-linear term can be, for example, a square root or any exponential function, sinusoidal function, a (linear or non-linear) combination of multiple non-linear functions or any arbitrary function that can be computed at the decoder.

According to an embodiment, the final prediction of the block is achieved by combining two or more of CCCM predictions with different non-linear terms. For example, one prediction may be achieved with CCCM model without non-linear term and one or more predictions that have the same or different non-linear terms, wherein the final prediction is then calculated by the weighted average of the predictions. The weight values for such operations may be fixed, or signalled into the bitstream, or may be decided based on certain factors such as block size, CCCM coefficients in different models, neighboring blocks prediction modes, etc.

According to an embodiment, the decision for using the non-linear term in the CCCM model is decided based on a texture analysis mechanism over reference samples and/or luma samples inside the block. For example, the average or DC values of the reference area and co-located luma samples may be used as a factor for deciding to use the non-linear term. If the average values are too different from each other (e.g. based on a certain threshold value), then the non-linear term is not used or vice versa. In another example, the slope of the linear relation between reference luma and chroma samples is used for deciding the usage of non-linear term in CCCM. In this case, some of the reference luma and chroma samples are used for the linear model (for example linear regression); if the slope of the linear model is smaller than a threshold or larger than a threshold then the non-linear term is used in CCCM process.

According to an embodiment, the binary choice of the use of the non-linear term is signalled by the encoder to the decoder.

According to an embodiment, the choice of the selected non-linear function is signalled by the encoder to the decoder at any given precision.

According to an embodiment, the shape, size, width, height, or other data determining the selection of the filter kernel is signalled by the encoder to the decoder using any given precision. The signalling can be done at different levels such as CU, PU, TU, CTU, Slice, Tile, Sub-picture, picture or sequence levels.

As mentioned above, the filter kernel dimensions can be 1D or 2D and can range from 1×1 to any dimensions that can be realized at the decoder. Also the shape of the filter kernel can be, for example, a row or a column, a cross or a diamond, or any shape that can be realized under the dimensions of the filter kernel.

According to an embodiment, the filter shape may cover only a subset of elements covered by the dimensions of the filter kernel.

According to an embodiment, the shape and/or size of the filter kernel may be decided adaptively based on certain factors such as block size, availability of the reference samples, location of the block in frame, coding modes of the neighbor blocks, etc.

According to an embodiment, the filter consists of a center (co-located), north (above), south (below), west (left) and east (right) luma samples, a bias term and a non-linear term derived from the center luma sample.

According to an embodiment, the filter consists of a center (co-located), south (below), west (left) and cast (right) luma samples, a bias term and a non-linear term derived from the center luma sample.

According to an embodiment, the filter consists of a center (co-located), north (above), south (below), west (left) and east (right) luma samples, a bias term and a square root of the center luma sample.

According to an embodiment, the filter consists of a center (co-located), north (above), south (below), west (left) and east (right) luma samples, a bias term and a squared center luma sample.

According to an embodiment, the filter consists of a center (co-located), north (above), south (below), west (left) and east (right) luma samples, a bias term and a squared center luma sample scaled to have the same dynamic range as the luma samples.

According to an embodiment, the binary choice of the use of the history based CCCM is signalled by the encoder to the decoder.

According to an embodiment, the index (or location) of the selected history based CCCM coefficients is signalled by the encoder to the decoder at any given precision.

According to an embodiment, the binary choice of the use of the weighted history based CCCM is signalled by the encoder to the decoder.

According to an embodiment, the weights for the history based CCCM is signalled by the encoder to the decoder using any given precision.

It is noted that all the above options regarding the history based CCCM (including the weighted variant) can be signalled by the encoder to the decoder separately for each chroma component.

According to an embodiment, the history based CCCM coefficients are computed (and/or updated) at CU-level or at CTU-level.

According to an embodiment, the correct CCCM coefficients from multiple set of coefficients from the history based CCCM are decided at the decoder side. This could be done, for example, using the available coefficients from the history and predicting one or more of the reference area samples and calculating the cost (e.g., distortion or difference) with respect to the reconstructed reference samples. The set of coefficients which results in the smallest cost is then selected and used for predicting the samples inside the block.

According to an embodiment, the weighted history based CCCM may be also decided based on similar approach by predicting the one or more of the reference sample areas with different history CCCM coefficients and different weight values and the best performing set(s) of coefficients and weight(s) that provides the smallest cost then is used for predicting the samples of the block.

According to an embodiment, the fixed luma down-sampling may be skipped and instead the full luma grid is used to derive the CCCM coefficients therefore obtaining an implicit down-sampling filter in the process for the case of down-sampled chroma.

According to an embodiment, the binary choice of skipping the fixed luma down-sampling is signalled by encoder to the decoder.

According to an embodiment, the luma samples used in CCCM model creation are low-pass filtered.

According to an embodiment, the CCCM coefficients include additional data terms that reside outside the filter kernel, such as already reconstructed (i.e., causal) chroma samples or spatial coordinates.

According to an embodiment, the choice of additional data terms is signalled by the encoder to the decoder at any given precision.

According to an embodiment, recursive prediction is used to include the causal chroma neighbourhood into the prediction.

According to an embodiment, the binary choice of using recursive prediction is signalled by the encoder to the decoder.

According to an embodiment, the spatial coordinates of the reconstructed sample can used as an additional data term in the filter. This allows to model the chroma samples using a surface model (such as planar or quadratic).

According to an embodiment, the binary choice of the use of spatial coordinates for filtering is signalled by the encoder to the decoder.

According to an embodiment, the selected surface model is signalled by the encoder to the decoder at any given precision.

According to an embodiment, the one or more CCCM modes are applied as a filtering and/or adjustment operation over non-CCCM predictions. For example, the CCCM filtering or adjustment may be applied to blocks that are predicted by angular prediction modes or existing CCLM modes. The parameters of the CCCM filter may be decided by using the re-predicted neighboring samples with the non-CCCM prediction that is used for predicting the samples inside the block. Then the re-predicted neighboring samples and the reconstructed neighboring samples is used for deriving the CCCM filter parameters.

According to an embodiment, the final prediction of a block is achieved by combining one or more of non-CCCM predictions (e.g., angular intra prediction, CCLM) and one or more of the CCCM predictions. The weights of such combination of different predictions may be fixed or signalled in the bitstream or may be decided based on prediction modes of the neighboring blocks and/or prediction mode of the co-located luma block.

According to an embodiment, the CCCM coefficients for a block are derived using reference samples above the block, reference samples left of the block or both above and left reference samples of the block. The choice of the said reference side samples for parameter derivation may be signalled in the bitstream or may be decided in the decoder side for example by using a texture analysis mechanism over the reference samples.

According to an embodiment, the shape, size, width, height, or other data determining the selection of the reference samples for CCCM model creation is signalled by the encoder to the decoder.

According to an embodiment, the type of the non-linear term in the CCCM model is decided based on a texture analysis mechanism over reference samples and/or luma samples inside the block.

According to an embodiment, the reference channel may be luma, chroma, R, G, B or any other color space format. For example, the CCCM may use reconstructed chroma Cb samples for predicting the chroma Cr samples or the other way around.

According to an embodiment, the CCCM scheme may also be used to predict other than chroma samples. For example, instead of using luma and chroma samples the embodiment may use intra and inter samples to further adjust the inter samples to match the intra neighborhood or vice-versa.

An apparatus according to an aspect comprises means for receiving an image block unit of a frame, the image block unit comprising samples in color channels comprising at least one chrominance channel and one luminance channel; means for reconstructing samples of said luminance channel of the image block unit; means for determining a reference area for predicting samples of at least one color channel of the image block unit, wherein said reference area comprises one or more of reference samples in a neighboring block in current color channel/frame, in the neighboring of a co-located block in reference color channel/frame; and/or inside the co-located block in reference color channel/frame; means for determining filter coefficients of a filter for said predicting based on the reference samples and a shape of the filter; and means for predicting samples of at least one color channel of the image block unit by performing a convolution between the samples of said luminance channels and the filter coefficients.

According to an embodiment, the apparatus comprises means for downsampling the samples of said luminance channels to correspond to a size of the samples of the chrominance samples prior to determining the filter coefficients.

According to an embodiment, said means for determining the filter coefficients comprise means for obtaining statistics from the reference samples for linear regression based on the shape of the filter; and means for obtaining the filter coefficients by applying a linear regression method on the obtained statistics.

According to an embodiment, said statistics comprise an auto-correlation matrix and a cross-correlation vector.

According to an embodiment, the shape of the filter is a 1-dimensional (1D-) vector of the filter coefficients or a 2-dimensional (2D-) array of the filter coefficients.

According to an embodiment, the apparatus comprises means for applying auxiliary parameters from outside of the shape of the filter into said convolution.

According to an embodiment, the apparatus comprises means for inputting to the filter a luma sample co-located with an output chroma sample, at least one luma sample above the co-located sample, at least one luma sample below the co-located sample, at least one luma sample left of the co-located sample, at least one luma sample right of the co-located sample and a bias term.

According to an embodiment, the apparatus comprises means for inputting to the filter a value determined by applying a non-linear function on the value of the co-located sample.

According to an embodiment, the apparatus comprises means for storing the filter coefficients in a memory; and means for receiving an indication from an encoder to reuse at least a subset of previously stored filter coefficients for predicting samples of at least one color channel of the current image block unit.

According to an embodiment, the apparatus comprises means for determining samples outside the reference area; means for obtaining statistics from the samples outside the reference area for linear regression based on the shape of the filter; means for obtaining the filter coefficients by applying a linear regression method on the obtained statistics; and means for storing the filter coefficients in the memory.

According to an embodiment, the apparatus comprises means for replacing any missing downsampled luminance sample by a zero-valued sample.

According to an embodiment, the apparatus comprises means for determining the samples not belonging to any object or texture inside said image block unit; and means for removing said samples from the reference area.

As a further aspect, there is provided an apparatus comprising: at least one processor and at least one memory, said at least one memory stored with code thereon, which when executed by said at least one processor, causes the apparatus to perform at least: receive an image block unit of a frame, the image block unit comprising samples in color channels comprising at least one chrominance channel and one luminance channel; reconstruct samples of said luminance channels of the image block unit; determine a reference area for predicting samples of at least one color channel of the image block unit, wherein said reference area comprises one or more of reference samples in a neighboring block in current color channel/frame, in the neighboring of a co-located block in reference color channel/frame; and/or inside the co-located block in reference color channel/frame; determine filter coefficients of a filter for said predicting based on the reference samples and a shape of the filter; and predict samples of at least one color channel of the image block unit by performing a convolution between the samples of said luminance channels and the filter coefficients.

Such apparatuses may comprise e.g. the functional units disclosed in any of the FIGS. 1, 2, 4*a*, and 4*b* for implementing the embodiments.

Such an apparatus further comprises code, stored in said at least one memory, which when executed by said at least one processor, causes the apparatus to perform one or more of the embodiments disclosed herein.

Figure 12:
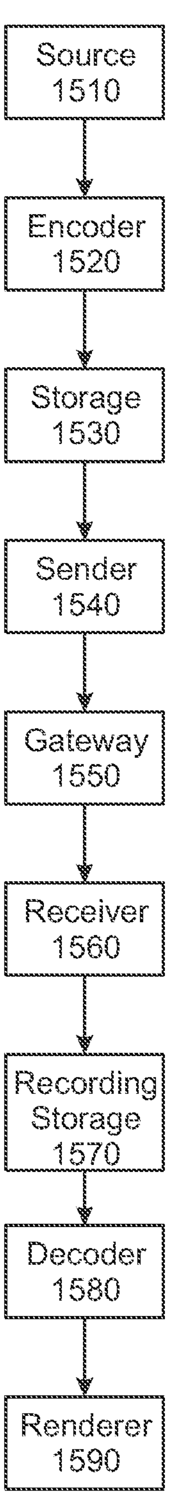
FIG. 12 shows a schematic diagram of an example multimedia communication system within which various embodiments may be implemented.

FIG. 12 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multi-tasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to and/or using terminology of HEVC and/or VVC. It needs to be understood that embodiments may be similarly realized with any video encoder and/or video decoder.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder. For example, some embodiments have been described related to generating a prediction block as part of encoding. Embodiments can be similarly realized by generating a prediction block as part of decoding, with a difference that coding parameters, such as the horizontal offset and the vertical offset, are decoded from the bitstream than determined by the encoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising at least one processor and at least one memory, said at least one memory comprising code thereon, which when executed by said at least one processor, causes the apparatus to at least:

receive an image block unit of a frame, the image block unit comprising samples in color channels comprising at least one chrominance channel and a luma channel;

reconstruct samples of said luma channel of the image block unit;

determine a reference area for predicting samples of at least one color channel of the image block unit, wherein said reference area comprises one or more reference samples in one or more of a neighboring block in a current color channel or the frame, a neighboring block of a co-located block in a reference color channel or a frame, and the co-located block in the reference color channel or the reference frame;

determine filter coefficients of a filter for said predicting samples of at least one color channel of the image block unit based on the one or more reference samples and a shape of the filter; and predict the samples of the at least one color channel of the image block unit by performing a convolution between one or more samples of said luma channel and the filter coefficients, wherein to determine the filter coefficients, the apparatus is configured to:

obtain statistics from one or more of the one or more reference samples for a linear regression based on the shape of the filter; and obtain the filter coefficients by applying a linear regression method on the obtained statistics, wherein said statistics comprise an auto-correlation matrix and a cross-correlation vector.

2. The apparatus according to claim 1, wherein the apparatus is further configured to downsample at least some samples of said luma channel to correspond to a size of the samples of the at least one chrominance channels prior to determining the filter coefficients.

3. The apparatus according to claim 1, wherein the shape of the filter is represented by a one dimensional (1D) vector of the filter coefficients or a two dimensional (2D) array of the filter coefficients.

4. The apparatus according to claim 1, wherein the apparatus is further configured to:

apply auxiliary parameters from outside of the shape of the filter into said convolution.

5. The apparatus according to claim 1, wherein the apparatus is further configured to input values associated with following to the filter:

a luma sample co-located with an output chroma sample;

at least one luma sample above the co-located luma sample;

at least one luma sample below the co-located luma sample;

at least one luma sample left of the co-located luma sample;

at least one luma sample right of the co-located luma sample; and a bias term.

6. The apparatus according to claim 5, wherein the apparatus is further configured to input to the filter a value determined by applying a non-linear function to the luma sample co-located with the output chroma sample.

7. The apparatus according to claim 1, wherein the apparatus is further configured to store the filter coefficients in a memory.

8. The apparatus according to claim 1, wherein the apparatus is further configured to:

determine samples outside the reference area;

obtain statistics from the samples outside the reference area for a linear regression based on the shape of the filter;

obtain the filter coefficients by applying a linear regression method on the obtained statistics; and store the filter coefficients in a memory.

9. The apparatus according to claim 2, wherein the apparatus is further configured to replace a missing sample from the downsampled samples of said luma channel with a zero-valued sample.

10. The apparatus according to claim 1, wherein the apparatus is further configured to:

determine one or more samples not belonging to an object or texture inside said image block unit; and remove said one or more samples from the reference area.

11. A method comprising receiving an image block unit of a frame, the image block unit comprising samples in color channels comprising at least one chrominance channel and a luma channel;

reconstructing samples of said luma channel of the image block unit;

determining a reference area for predicting samples of at least one color channel of the image block unit, wherein said reference area comprises one or more reference samples in one or more of a neighboring block in a current color channel or the frame, a neighboring block of a co-located block in a reference color channel or a reference frame, and the co-located block in the reference color channel or the reference frame;

determining filter coefficients of a filter for said predicting samples of at least one color channel of the image block unit based on the one or more reference samples and a shape of the filter; and predicting the samples of the at least one color channel of the image block unit by performing a convolution between one or more samples of said luma channel and the filter coefficients, wherein said determining the filter coefficients comprises:

obtaining statistics from one or more of the one or more reference samples for a linear regression based on the shape of the filter; and obtaining the filter coefficients by applying a linear regression method on the obtained statistics, wherein said statistics comprise an auto-correlation matrix and a cross-correlation vector.

12. The method according to claim 11, comprising downsampling at least some samples of said luma channel to correspond to a size of the samples of the at least one chrominance channels prior to determining the filter coefficients.

13. The method according to claim 11, wherein the shape of the filter is represented by a one dimensional (1D) vector of the filter coefficients or a two dimensional (2D) array of the filter coefficients.

14. The method according to claim 11, comprising:

applying auxiliary parameters from outside of the shape of the filter into said convolution.

15. The method according to claim 11, comprising inputting values associated with following to the filter: a luma sample co-located with an output chroma sample, at least one luma sample above the co-located luma sample, at least one luma sample below the co-located luma sample, at least one luma sample left of the co-located luma sample, at least one luma sample right of the co-located luma sample, and a bias term.

16. The method according to claim 15, comprising:

inputting to the filter a value determined by applying a non-linear function to the luma sample co-located with the output chroma sample.

* * * * *